United States Patent [19]
Atsumi

[11] Patent Number: 5,153,559
[45] Date of Patent: Oct. 6, 1992

[54] EQUIPMENT FOR DETECTING THE MOVEMENT OF A PRECEDING VEHICLE AND GIVING WARNING

[75] Inventor: Haruo Atsumi, Shizuoka, Japan
[73] Assignee: A.C.E. Corporation, Japan
[21] Appl. No.: 713,711
[22] Filed: Jun. 11, 1991

[30] Foreign Application Priority Data

Jun. 27, 1990 [JP] Japan .................... 2-170761

[51] Int. Cl.⁵ .............................. B60Q 1/00
[52] U.S. Cl. .................... 340/435; 340/436; 340/901; 340/903; 340/904; 180/167; 180/271
[58] Field of Search ............... 340/435, 436, 901, 903, 340/904, 932.2, 943, 479; 180/167, 169, 170, 171, 271, 272

[56] References Cited

U.S. PATENT DOCUMENTS

| | | | |
|---|---|---|---|
| 4,551,722 | 11/1985 | Tsuda et al. | 340/904 |
| 4,779,095 | 10/1988 | Guerrei | 340/901 |
| 4,833,469 | 5/1989 | David | 340/435 |
| 5,014,200 | 5/1991 | Chundrlik et al. | 340/904 |
| 5,059,946 | 10/1991 | Hollowbush | 340/903 |

Primary Examiner—Donnie L. Crosland
Attorney, Agent, or Firm—Harrison & Egbert

[57] ABSTRACT

An equipment for detecting the movement of a preceding vehicle and giving warning. When one's own vehicle (hereinafter referred to as "the vehicle") is at a stop, the equipment detects the forward or backward movement of said preceding vehicle and gives warning to the driver of the vehicle. The equipment comprises a distance measuring sensor for measuring the distance between the vehicle and said preceding vehicle when the vehicle is at a stop, a memory device for memorizing a value measured by said distance measuring sensor, a measurement command device for making said distance measuring sensor repeatedly measure the distance between the vehicle and said preceding vehicle, a comparison device for comparing said memorized value measured by said distance measuring sensor with values subsequently measured by said distance measuring sensor, and a warning device for giving warning when any of said values subsequently measured is different from said memorized value.

4 Claims, 4 Drawing Sheets

EQUIPMENT FOR DETECTING THE MOVEMENT OF A PRECEDING VEHICLE AND GIVING WARNING

BACKGROUND OF THE INVENTION (1) Field of the Invention

The present invention relates to an equipment for detecting the movement of a preceding vehicle and giving warning. More particularly, the invention relates to an equipment of a vehicle such as an automobile and a truck which equipment, when the vehicle is at a stop, detects the forward or backward movement of a preceding vehicle and gives warning to the driver of the vehicle. In the present specification and claims, "the vehicle" means a vehicle of one's own, and "preceding vehicle" means a vehicle existing in front of the vehicle.

(2) Description of the Prior Art

Vehicle equipments for detecting the distance between moving vehicles and giving warning to the driver are already known. When the vehicle is moving, these equipments detect the distance between the vehicle and a preceding vehicle or a succeeding vehicle and give warning to the driver of the vehicle if the measured distance becomes shorter than a predetermined value. However, the equipment for detecting the movement of a preceding vehicle and giving warning as described above has not been provided yet.

As long as the vehicle is on the road, it is needless to say that the driver must keep carefully looking to the front even when the vehicle is stopped because of a traffic signal or a traffic jam. In large cities and the suburbs thereof at present, vehicles are forced to stop very frequently because of traffic signals, traffic jams, etc. Such frequent stoppages make the driver tired.

BRIEF SUMMARY OF THE INVENTION

It is an object of the invention to lessen the fatigue of the driver by providing an auxiliary means for confirming the front when the vehicle is at a stop.

It is a specific object of the invention to provide an equipment for detecting the movement of a preceding vehicle and giving warning to the driver when the preceding vehicle has moved forward or backward.

These and other objects have been attained by an equipment for detecting the movement of a preceding vehicle and giving warning, said equipment comprising a distance measuring sensor for measuring the distance between the vehicle and said preceding vehicle when the vehicle is at a stop, a memory means for memorizing a value measured by said distance measuring sensor, a measurement command means for making said distance measuring sensor repeatedly measure the distance between the vehicle and said preceding vehicle, a comparison means for comparing said memorized value measured by said distance measuring sensor with values subsequently measured by said distance measuring sensor, and warning means for giving warning when any of said values subsequently measured is different from said memorized value.

The equipment of the present invention has any of the following starting means:

(1) A manual switch. The equipment is started when the manual switch is manipulated.

(2) A vehicle speed sensor adapted to detect a zero speed of the vehicle when the vehicle is at a stop and give a zero speed detection signal. The equipment is started when the vehicle speed sensor gives a zero speed detection signal.

(3) A brake pedal pressing detection means adapted to give a brake pedal pressing detection signal when the brake pedal is pressed, and said manual switch or said vehicle speed sensor. The equipment is started when the brake pedal pressing detection means gives a brake pedal pressing detection signal and said manual switch is manipulated or said vehicle speed sensor gives a zero speed detection signal.

The operation of the equipment according to the present invention will now be described.

The equipment of the present invention is started in any of the following three cases:

(1) The manual switch is manipulated by the driver, etc. when the vehicle is at a stop.

(2) The vehicle speed sensor gives a zero speed detection signal when the vehicle is at a stop.

(3) The brake pedal pressing detection means gives a brake pedal pressing detection signal, and the manual switch is manipulated by the driver, etc. or the vehicle speed sensor gives a zero speed detection signal.

When the equipment is thus started, the measurement command means makes the distance measuring sensor repeatedly measure the distance between the vehicle and a preceding vehicle. A value measured by the distance measuring sensor is memorized by the memory means, and the memorized value is compared by the comparison means with values subsequently measured. When the values subsequently measured are the same as the memorized value, which means that the preceding vehicle remains stopped, then the warning means does not give warning. When any of the values subsequently measured is different from the memorized value, which means that the preceding vehicle has moved forward or backward or a person or a thing has come into the space between the vehicle and the preceding vehicle, then the warning means gives warning.

Thus, when the vehicle is at a stop because of a traffic signal, traffic jam, etc., the equipment of the present invention gives warning to the driver as soon as the preceding vehicle has moved forward or backward or a person or a thing has come into the space between the vehicle and the preceding vehicle. This means that the equipment of the present invention assists the driver in confirming the front and thereby lessens the fatigue of the driver.

DETAILED DESCRIPTION

Figure 1:
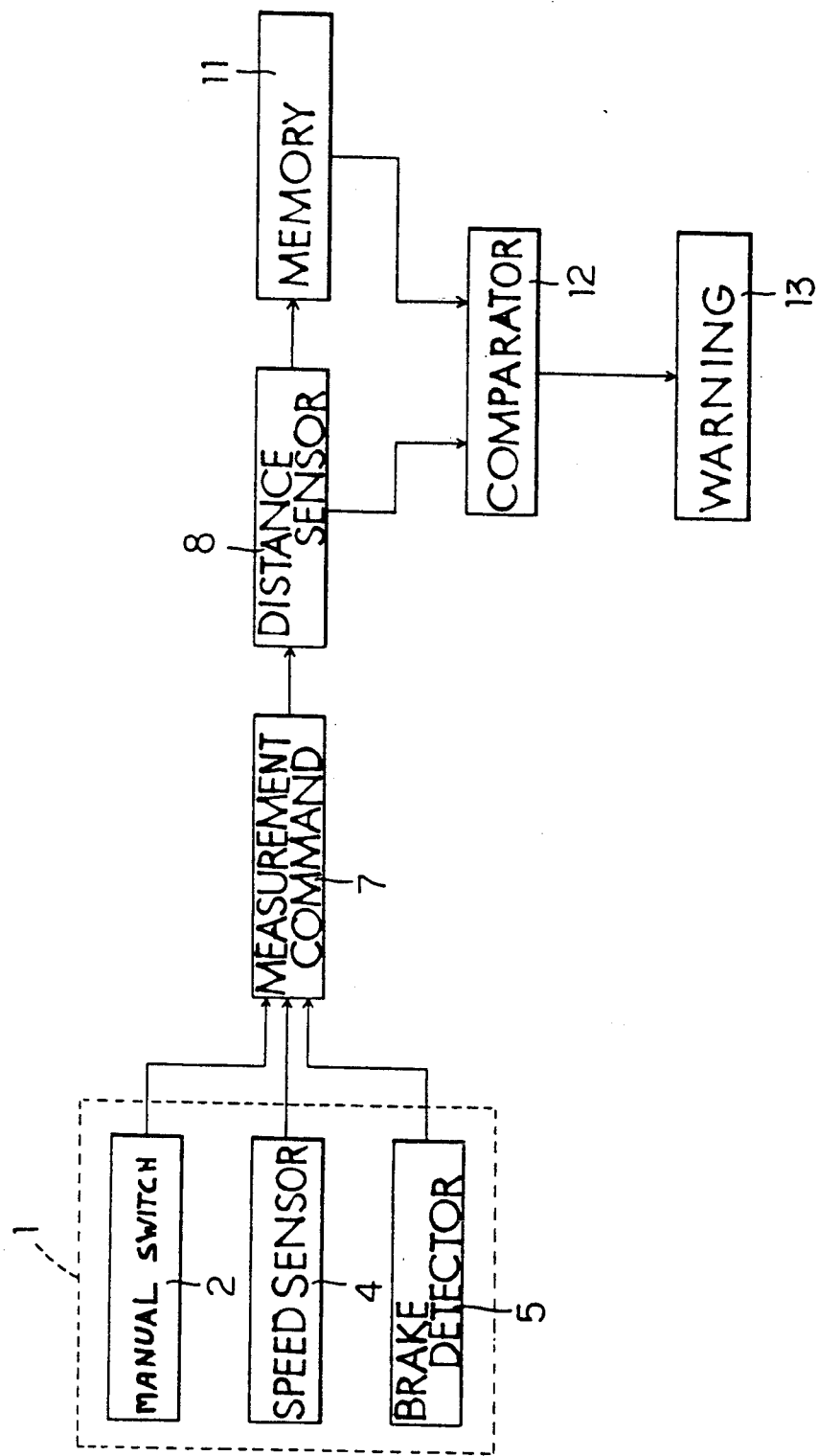
FIG. 1 is a block diagram of an equipment according to the present invention.

The present invention will now be described in detail with reference to the attached drawings.

An equipment for detecting the movement of a preceding vehicle and giving warning according to the present invention is provided with starting means 1 which may be any of the following:

(1) A manual switch (MS) 2. The equipment is started when the manual switch 2 is manipulated.

(2) A vehicle speed sensor (VSS) 4 adapted to detect a zero speed of the vehicle 3 when the vehicle 3 is at a stop and give a zero speed detection signal. The equipment is started when the vehicle speed sensor 4 gives a zero speed detection signal.

(3) A brake pedal pressing detection means (BPPDM) 5 adapted to give a brake pedal pressing detection signal when the brake pedal is pressed, and said manual switch 2 or said vehicle speed sensor 4. The equipment is started when the brake pedal pressing detection means 5 gives a brake pedal pressing detection signal and said manual switch 2 is manipulated or said vehicle speed sensor 4 gives a zero speed detection signal.

The manual switch 2 may be a push-button switch for example, said push-button switch being provided on a casing 6 of the equipment near the driver's seat. (c) in FIG. 2 shows a signal given by the manual switch 2.

Figure 2:
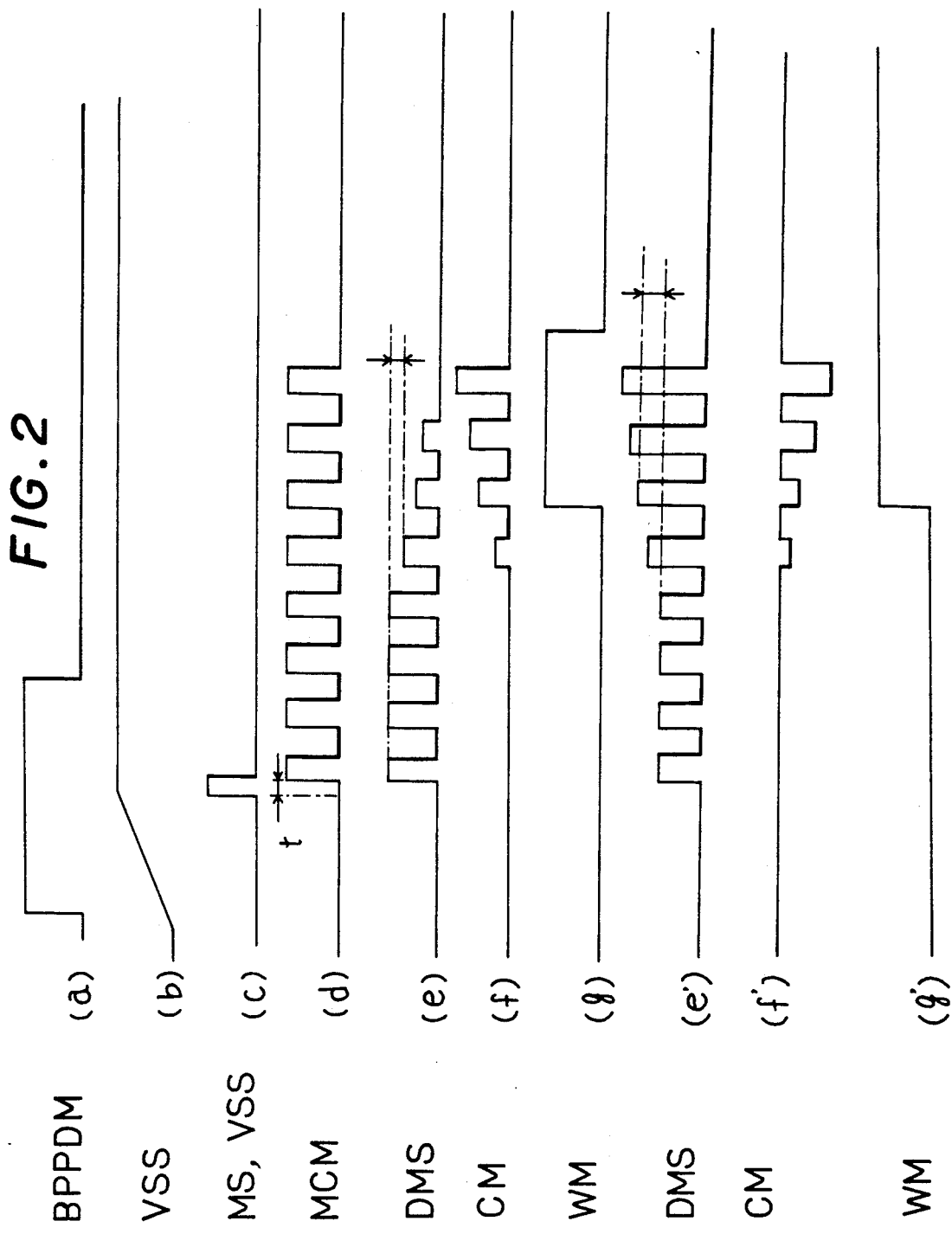
FIG. 2 is a time chart thereof.

The vehicle speed sensor 4 is attached to an axle of the vehicle for example (b) in FIG. 2 shows a signal given by the vehicle speed sensor 4.

The brake pedal pressing detection means 5 is attached near the brake pedal of the vehicle for example. (a) in FIG. 2 shows a brake pedal pressing detection signal given by the brake pedal pressing detection means 5.

Numeral 7 represents a measurement command means (MCM) for making a distance measuring sensor (DMS) 8 repeatedly measure the distance D between the vehicle 3 and a preceding vehicle 9. (d) in FIG. 2 shows a measurement command signal given by the measurement command means 7. In FIG. 2, the measurement command means 7 gives the measurement command signal in the lapse of a set time t of a timer (T) 10 (FIG. 4) after the starting means 1 gives a signal.

The distance measuring sensor 8 measures the distance D between the vehicle 3 and the preceding vehicle 9 by means of an ultrasonic wave or light for example. The distance measuring sensor 8 may be disposed in a control box on a front portion of the vehicle or within the vehicle. (e) in FIG. 2 shows a signal given by the distance measuring sensor 8. The distance measuring sensor 8 measures the distance D each time it receives the signal from the measurement command means 7.

A value measured by the distance measuring sensor 8 is memorized by a memory means (memory) (MM) 11.

Said memorized value measured by the distance measuring sensor 8 is compared by a comparison means (comparator) (CM) 12 with values subsequently measured by the distance measuring sensor 8. See (f) and (f') in FIG. 2. (e) and (f) in FIG. 2 show a case where the preceding vehicle 9 has moved forward. (e') and (f') in FIG. 2 show a case where the preceding vehicle 9 has moved backward or a person or a thing has come into the space between the vehicle 3 and the preceding vehicle 9.

Figure 4:
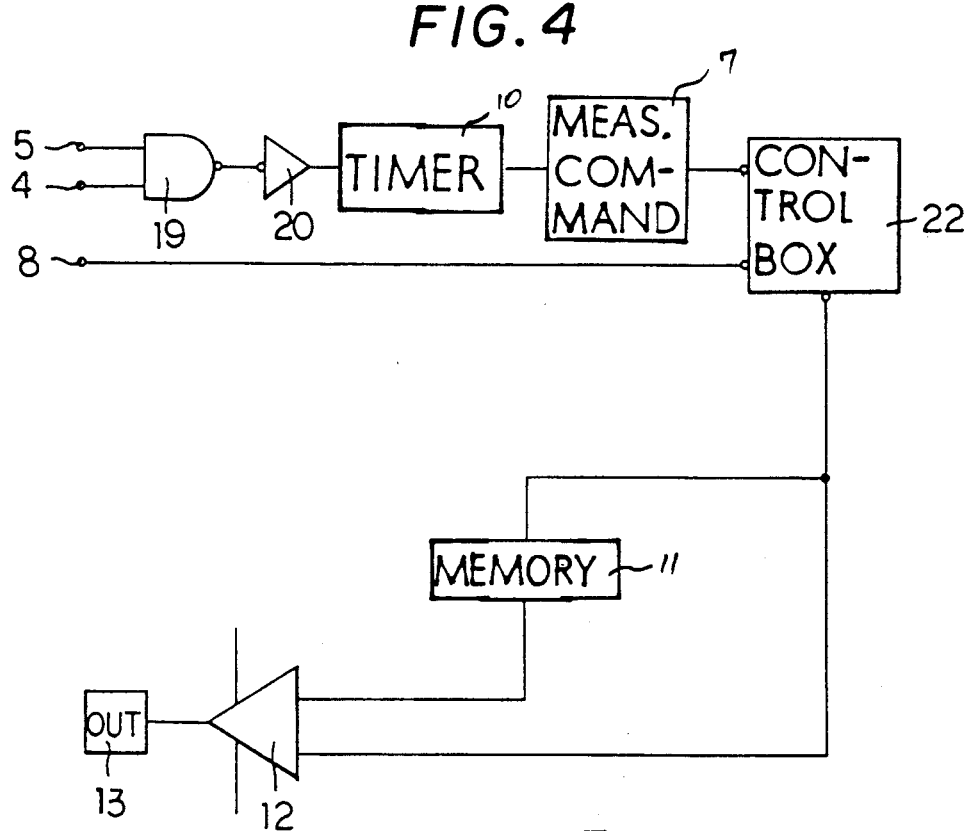
FIG. 4 is a circuit diagram thereof.
Figure 5:
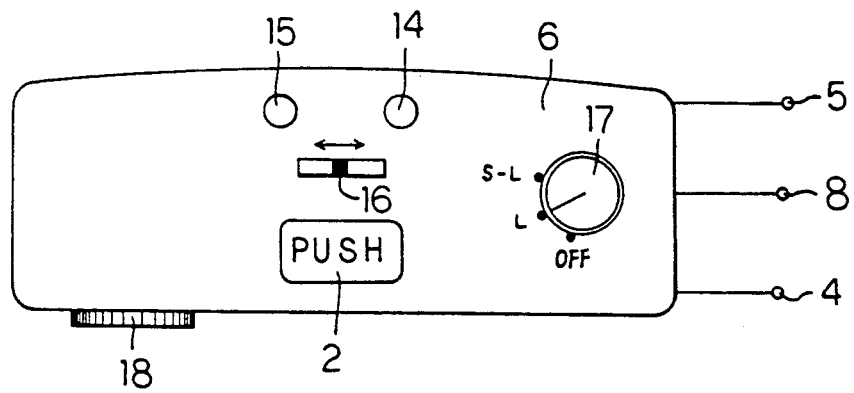
FIG. 5 is a front view showing a casing thereof.
Figure 6:
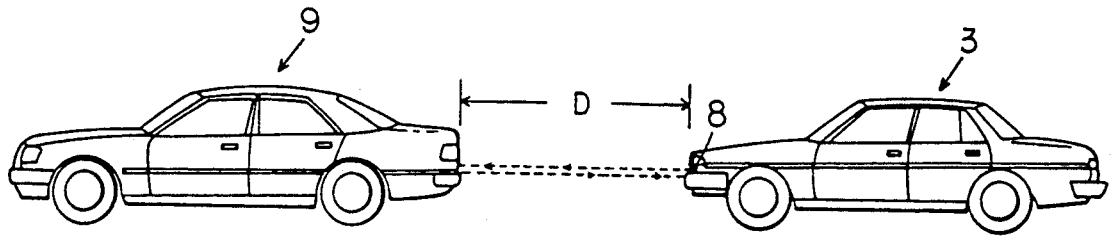
FIG. 6 is a side view showing a positional relationship between the vehicle and a preceding vehicle.

When any of said values subsequently measured is different from said memorized value, the comparison means 12 gives a signal to actuate a warning means (WM) 13. See (g) and (g') in FIG. 2. The warning means 13 is preferably a device for emitting sound, light, etc. The warning means 13 may give different kinds of warning according as the preceding vehicle 9 has moved forward or the preceding vehicle 9 has moved backward or a person, etc. has come into the space between the vehicle 3 and the preceding vehicle 9. The casing 6 shown in FIG. 5 is provided with a green lamp 14, a red lamp 15, a changeover switch 16 between these lamps 14 and 15, a warning selector switch 17 and a volume control switch 18 for warning sound. The green lamp 14 may be turned on for example when the preceding vehicle 9 has moved forward. The red lamp 15 may be turned on for example when the preceding vehicle 9 has moved backward or a person, etc. has come into the space between the vehicle 3 and the preceding vehicle 9. The warning selector switch 17 makes it possible to change over between "sound & light" (S-L), "light only" (L) and "no warning" (OFF). In FIG. 4, numeral 19 represents a NAND gate, 20 representing an inverter, 22 representing a control box for the input and output of distance measurement signals.

Figure 3:
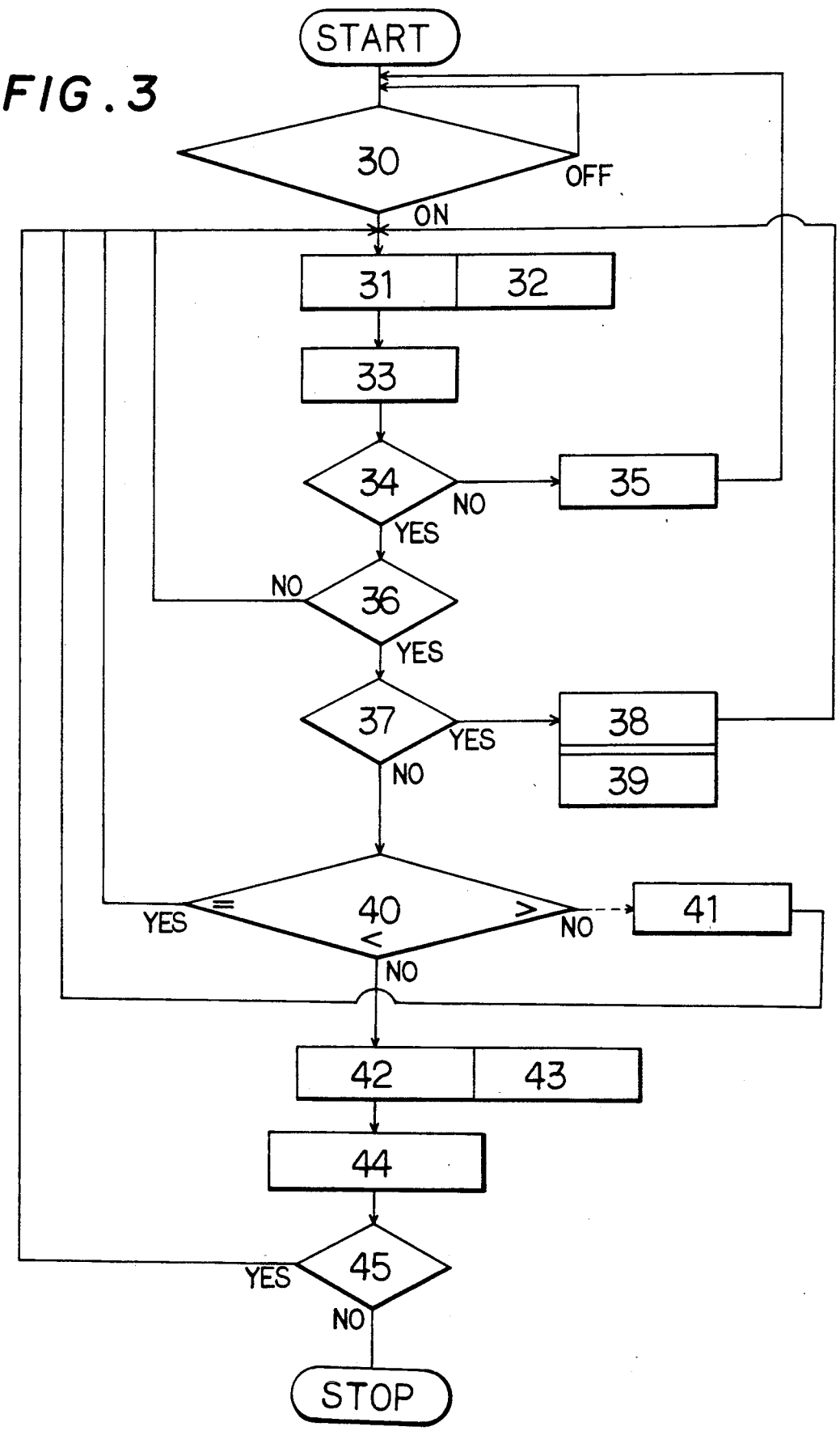
FIG. 3 is a flow chart thereof.

FIG. 3 is a flow chart of an equipment in which the distance D between the vehicle 3 and the preceding vehicle 9 is measured by means of a pulse number counting system. Numerals in FIG. 3 represent steps as follows:

30: Starting means 1
31: Measurement pulses are started
32: Distance counter is started.
33: Counter of the number of times of measurements is started.
34: Are there response pulses?
35: Indication that the distance is too long
36: The number of times of measurements $N \geq A$?
37: The number of times of measurements $n = A$?
38: Distance counter memory is actuated.
39: Setting indication
40: Distance
memory value = counter value?
41: Buzzer "a" (coming near)
42: Buzzer "b" (moving away)
43: Setting indication is turned off.
44: Counter of the number of times of measurements is reset.
$n = 0$
45: How long is the brake pedal pressed? $t > B$ sec.?

In the steps 36 and 37, "A" may be 2 for example. In this case, the value measured for the first time is neglected.

Regarding the step 45 of the flow chart, if the brake pedal is pressed for a period of time longer than a predetermined time of B sec., the equipment is started again. In other words, if the brake pedal is pressed, the equipment is not started again immediately, the equipment being started again only after the lapse of B sec. The object of this behavior is to prevent the equipment from giving warning frequently when the preceding vehicle repeats moving and stopping frequently. In a case where the preceding vehicle stops immediately after the equipment detected the movement of the preceding vehicle and gave warning, the equipment is not started again until the predetermined time of B sec. passes if the brake pedal is pressed.

What is claimed is:

1. An equipment for detecting the movement of a preceding vehicle and giving warning, said equipment comprising a distance measuring sensor for measuring the distance between the vehicle and said preceding vehicle when the vehicle is at a stop, a memory means for memorizing a value measured by said distance measuring sensor, a measurement command means for making said distance measuring sensor repeatedly measure the distance between the vehicle and said preceding vehicle, a comparison means for comparing said memorized value measured by said distance measuring sensor with values subsequently measured by said distance measuring sensor, and warning means for giving warning when any of said values subsequently measured is different from said memorized value.

2. An equipment as claimed in claim 1 wherein said equipment has a manual switch as a starting means thereof, and said equipment is started when the manual switch is manipulated.

3. An equipment as claimed in claim 1 wherein said equipment has, as a starting means thereof, a vehicle speed sensor adapted to detect a zero speed of the vehicle when the vehicle is at a stop and give a zero speed detection signal, said equipment being started when said vehicle speed sensor gives a zero speed detection signal.

4. An equipment as claimed in claim 1 wherein said equipment has, as starting means thereof, a brake pedal pressing detection means adapted to give a brake pedal pressing detection signal when the brake pedal is pressed, and said manual switch or said vehicle speed sensor, said equipment being started when said brake pedal pressing detection means gives a brake pedal pressing detection signal and said manual switch is manipulated or said vehicle speed sensor gives a zero speed detection signal.

* * * * *